(12) United States Patent
Yi et al.

(10) Patent No.: US 11,501,415 B2
(45) Date of Patent: Nov. 15, 2022

(54) METHOD AND SYSTEM FOR HIGH-RESOLUTION IMAGE INPAINTING

(71) Applicants: Zili Yi, Burnaby (CA); Qiang Tang, Burnaby (CA); Shekoofeh Azizi, Vancouver (CA); Daesik Jang, Coquitlam (CA); Zhan Xu, Richmond (CA)

(72) Inventors: Zili Yi, Burnaby (CA); Qiang Tang, Burnaby (CA); Shekoofeh Azizi, Vancouver (CA); Daesik Jang, Coquitlam (CA); Zhan Xu, Richmond (CA)

(73) Assignee: Huawei Technologies Co. Ltd., Shenzhen (CN)

( * ) Notice: Subject to any disclaimer, the term of this patent is extended or adjusted under 35 U.S.C. 154(b) by 8 days.

(21) Appl. No.: 17/080,714

(22) Filed: Oct. 26, 2020

(65) Prior Publication Data
US 2021/0150678 A1 May 20, 2021

Related U.S. Application Data

(60) Provisional application No. 62/935,992, filed on Nov. 15, 2019.

(51) Int. Cl.
*G06K 9/00* (2022.01)
*G06T 5/00* (2006.01)
(Continued)

(52) U.S. Cl.
CPC ............ *G06T 5/005* (2013.01); *G06K 9/6215* (2013.01); *G06N 3/084* (2013.01); *G06T 3/4046* (2013.01);
(Continued)

(58) Field of Classification Search
CPC ................. G06T 5/005; G06T 3/4046; G06T 2207/20016; G06T 2207/20081;
(Continued)

(56) References Cited

U.S. PATENT DOCUMENTS

| 8,483,516 B2 | 7/2013 | Chien et al. |
| 2014/0112548 A1* | 4/2014 | Huang .................... G06T 5/005 382/108 |

(Continued)

FOREIGN PATENT DOCUMENTS

| CN | 1930890 A | 3/2007 |
| CN | 103839242 A | 6/2014 |

(Continued)

*Primary Examiner* — Charlotte M Baker

(57) ABSTRACT

Methods and systems for high-resolution image inpainting are disclosed. An original high-resolution image to be inpainted is obtained, as well as an inpainting mask indicating an inside-mask area to be inpainted. The original high-resolution image is down-sampled to obtain a low-resolution image to be inpainted. Using a trained inpainting generator, a low-resolution inpainted image and a set of attention scores are generated from the low-resolution image. The attention scores represent the similarity between inside-mask regions and outside-mask regions. A high-frequency residual image is computed from the original high-resolution image. An aggregated high-frequency residual image is generated using the attention scores, including high-frequency residual information for the inside-mask area. A high-resolution inpainted image is outputted by combining the aggregated high-frequency residual image and a low-frequency inpainted image generated from the low-resolution inpainted image.

20 Claims, 8 Drawing Sheets

(51) Int. Cl.
*G06T 3/40* (2006.01)
*G06N 3/08* (2006.01)
*G06K 9/62* (2022.01)

(52) U.S. Cl.
CPC .............. *G06T 2207/20016* (2013.01); *G06T 2207/20081* (2013.01); *G06T 2207/20084* (2013.01)

(58) Field of Classification Search
CPC ........ G06T 2207/20084; G06T 3/4053; G06K 9/6215; G06N 3/084; G06N 3/0454; G06N 3/0472; G06V 10/82
USPC .................................................. 382/100, 108
See application file for complete search history.

(56) References Cited

U.S. PATENT DOCUMENTS

| | | | | |
|---|---|---|---|---|
| 2017/0061592 | A1* | 3/2017 | Reinhard | G06T 5/005 |
| 2019/0004533 | A1* | 1/2019 | Huang | H04N 5/2258 |
| 2021/0056348 | A1* | 2/2021 | Berlin | G06K 9/6256 |

FOREIGN PATENT DOCUMENTS

| | | |
|---|---|---|
| CN | 107133921 A | 9/2017 |
| CN | 109791687 A | 5/2019 |
| WO | 2017075768 A1 | 5/2017 |

\* cited by examiner 702 initialization;
704 while *G has not converged* do
706     for *i = 1,...,5* do
708         Sampling batch images x from training data;
710         Generating random masks m for x;
712         Getting inpainted $y \leftarrow G(\mathbf{x}, \mathbf{m})$;
714         Pasting back $\tilde{\mathbf{x}} \leftarrow \mathbf{y} \odot \mathbf{m} + \mathbf{x} \odot (1 - \mathbf{m})$;
716         Sampling a random number $\alpha \in U[0, 1]$;
718         Getting interpolation $\hat{\mathbf{x}} \leftarrow (1 - \alpha)\mathbf{x} + \alpha\tilde{\mathbf{x}}$;
720         Updating the discriminator D with loss $L_d$;
722     end
724     Sampling batch images x from training data;
726     Generating random masks m for x;
728     Getting Inpainted $y \leftarrow G(\mathbf{x}, \mathbf{m})$;
730     Pasting back $\tilde{\mathbf{x}} \leftarrow \mathbf{y} \odot \mathbf{m} + \mathbf{x} \odot (1 - \mathbf{m})$;
732     Updating generator G with loss $L_g$;
734 end

FIG. 7

METHOD AND SYSTEM FOR HIGH-RESOLUTION IMAGE INPAINTING

CROSS-REFERENCE TO RELATED APPLICATIONS

The present disclosure claims priority from U.S. provisional patent application No. 62/935,992, entitled "Very High-Resolution Image In-Painting with Neural Networks", filed Nov. 15, 2019, the entirety of which is hereby incorporated by reference.

FIELD

Examples of the present disclosure relate to the field of computer vision, in particular methods and systems for digital image editing including inpainting.

BACKGROUND

Image inpainting refers to techniques used to reconstruct missing or corrupted portions of an image in a way that is visually and semantically plausible. In the case of digital images, inpainting may be used not only to restore images that have been corrupted, but also as a technique for digital image editing. For example, a user may wish to edit a digital image by altering object positions within the image, or removing unwanted visual elements in the image, in addition to restoring corrupted portions of the image. A digital image, in the present disclosure, may include static images (e.g., an image is a digital photograph) as well as video images (e.g., an image is a frame of a video), among other possibilities.

Currently, image inpainting remains challenging, due to the inherent ambiguity of the problem and the complexity of most natural images. Solutions for image inpainting include traditional techniques (i.e., without using machine learning) and machine learning-based techniques. Compared to traditional techniques, machine learning-based techniques have been found to be more adept in inferring visually and semantically plausible content for missing portions of an image, especially when inpainting structured images (e.g., images that include faces, objects, and natural scenes). Existing machine learning-based techniques typically employ convolutional layers directly on the original input image. When the original image is high-resolution (e.g., being 1024×1024 pixels in size, or more), the memory usage required for carrying out the machine learning-based inpainting task could become too high for practical use. Another drawback of existing machine learning-based techniques is that the quality of the inpainting typically deteriorates significantly when the size of the portion to be reconstructed increases with image size. Further, even if training of the neural network for machine learning-based inpainting is feasible, it may be inefficient and/or costly to access large amounts of high-resolution images as training data.

Accordingly, it would be useful to provide a machine learning-based technique for image inpainting of high-resolution images.

SUMMARY

In various examples, the present disclosure describes methods and systems for inpainting of high-resolution images, using a neural network. The disclosed examples enable inpainting of high-resolution images to be practically implemented, with greater efficiency and/or requiring fewer resources (e.g., memory resources, processing power) compared to existing machine learning-based techniques.

Examples of the present disclosure may enable inpainting of images as large as 8K resolution (which refers to an image having a resolution with a width of about 8000 pixels), or higher. Examples of the present disclosure may also enable inpainting of images with large portions to be reconstructed (e.g., up to 25% or more of the image), with sufficient quality.

In some example aspects, the present disclosure describes a method for high-resolution image inpainting. The method includes: obtaining an original high-resolution image to be inpainted, and an inpainting mask indicating an inside-mask area to be inpainted; down-sampling the original high-resolution image to obtain a low-resolution image to be inpainted; generating, from the low-resolution image using a trained inpainting generator, a low-resolution inpainted image and a set of attention scores, the set of attention scores representing a similarity between regions of the inside-mask area and regions of an outside-mask area; computing, from the original high-resolution image, a high-frequency residual image; generating, using the set of attention scores, an aggregated high-frequency residual image including computed high-frequency residual information for at least the inside-mask area; and outputting, as a high-resolution inpainted image, a combination of at least the aggregated high-frequency residual image and a low-frequency inpainted image, the low-frequency inpainted image being generated from the low-resolution inpainted image.

In any of the above examples, the inpainting generator may include a coarse network and a refine network, the coarse network generating a coarse inpainting output from the low-resolution image, the coarse inpainting output and the low-resolution image being provided as input to the refine network to output the low-resolution inpainted image and the set of attention scores.

In any of the above examples, the set of attention scores may be computed based on a highest-level feature map of the refine network.

In any of the above examples, the set of attention scores may be used as aggregation weights to compute multiple contextualized feature maps for respective layers of the refine network.

In any of the above examples, the inpainting generator may be a trained generator network that was trained using low-resolution images as training data.

In any of the above examples, the training data may include randomly generated inpainting masks to be applied to the low-resolution images.

In any of the above examples, the aggregated high-frequency residual image may include high-frequency residual information computed for the inside-mask area, using weighted aggregation of high-frequency residual information from the outside-mask area, the set of attention scores being used as aggregation weights.

In any of the above examples, generating the aggregated high-frequency residual image may include: calculating, for each given region of the inside-mask area, high-frequency residual information for the given region of the inside-mask area using a weighted aggregation of high-frequency residual information from every region of the outside-mask area, the set of attention scores being used as the aggregation weights.

In any of the above examples, the aggregated high-frequency residual image may include high-frequency residual information for only the inside-mask area, the aggregated high-frequency image may be combined with the low-frequency inpainted image for only the inside-mask area, and the combination of the aggregated high-frequency image and the low-frequency inpainted image may be further combined with the outside-mask area of the original high-resolution image, to output the high-resolution inpainted image.

In any of the above examples, the aggregated high-frequency residual image may include high-frequency residual information for the inside-mask area, and also may include high-frequency residual information for the outside-mask area, and the aggregated high-frequency residual image may be combined with the low-frequency inpainted image to output the high-resolution inpainted image.

In some example aspects, the present disclosure describes a device for high-resolution image inpainting. The device includes: a processor configured to execution instructions to cause the device to: obtain an original high-resolution image to be inpainted, and an inpainting mask indicating an inside-mask area to be inpainted; down-sample the original high-resolution image to obtain a low-resolution image to be inpainted; generate, from the low-resolution image using a trained inpainting generator, a low-resolution inpainted image and a set of attention scores, the set of attention scores representing a similarity between regions of the inside-mask area and regions of an outside-mask area; compute, from the original high-resolution image, a high-frequency residual image; generate, using the set of attention scores, an aggregated high-frequency residual image including computed high-frequency residual information for at least the inside-mask area; and output, as a high-resolution inpainted image, a combination of at least the aggregated high-frequency residual image and a low-frequency inpainted image, the low-frequency inpainted image being generated from the low-resolution inpainted image.

In some examples, the processor may be configured to execute instructions to cause the device to perform any of the methods described above.

In some example aspects, the present disclosure describes a computer-readable medium having instructions encoded thereon. The instructions, when executed by a processor of a device, cause the device to: obtain an original high-resolution image to be inpainted, and an inpainting mask indicating an inside-mask area to be inpainted; down-sample the original high-resolution image to obtain a low-resolution image to be inpainted; generate, from the low-resolution image using a trained inpainting generator, a low-resolution inpainted image and a set of attention scores, the set of attention scores representing a similarity between regions of the inside-mask area and regions of an outside-mask area; compute, from the original high-resolution image, a high-frequency residual image; generate, using the set of attention scores, an aggregated high-frequency residual image including computed high-frequency residual information for at least the inside-mask area; and output, as a high-resolution inpainted image, a combination of at least the aggregated high-frequency residual image and a low-frequency inpainted image, the low-frequency inpainted image being generated from the low-resolution inpainted image.

In some examples, the instructions may cause the device to perform any of the methods described above.

BRIEF DESCRIPTION OF THE DRAWINGS

Reference will now be made, by way of example, to the accompanying drawings which show example embodiments of the present application, and in which:

FIG. 7 shows example pseudocode for implementing the example method of FIG. 6, in accordance with some embodiments of the present disclosure.

Similar reference numerals may have been used in different figures to denote similar components.

DESCRIPTION OF EXAMPLE EMBODIMENTS

Figure 1:
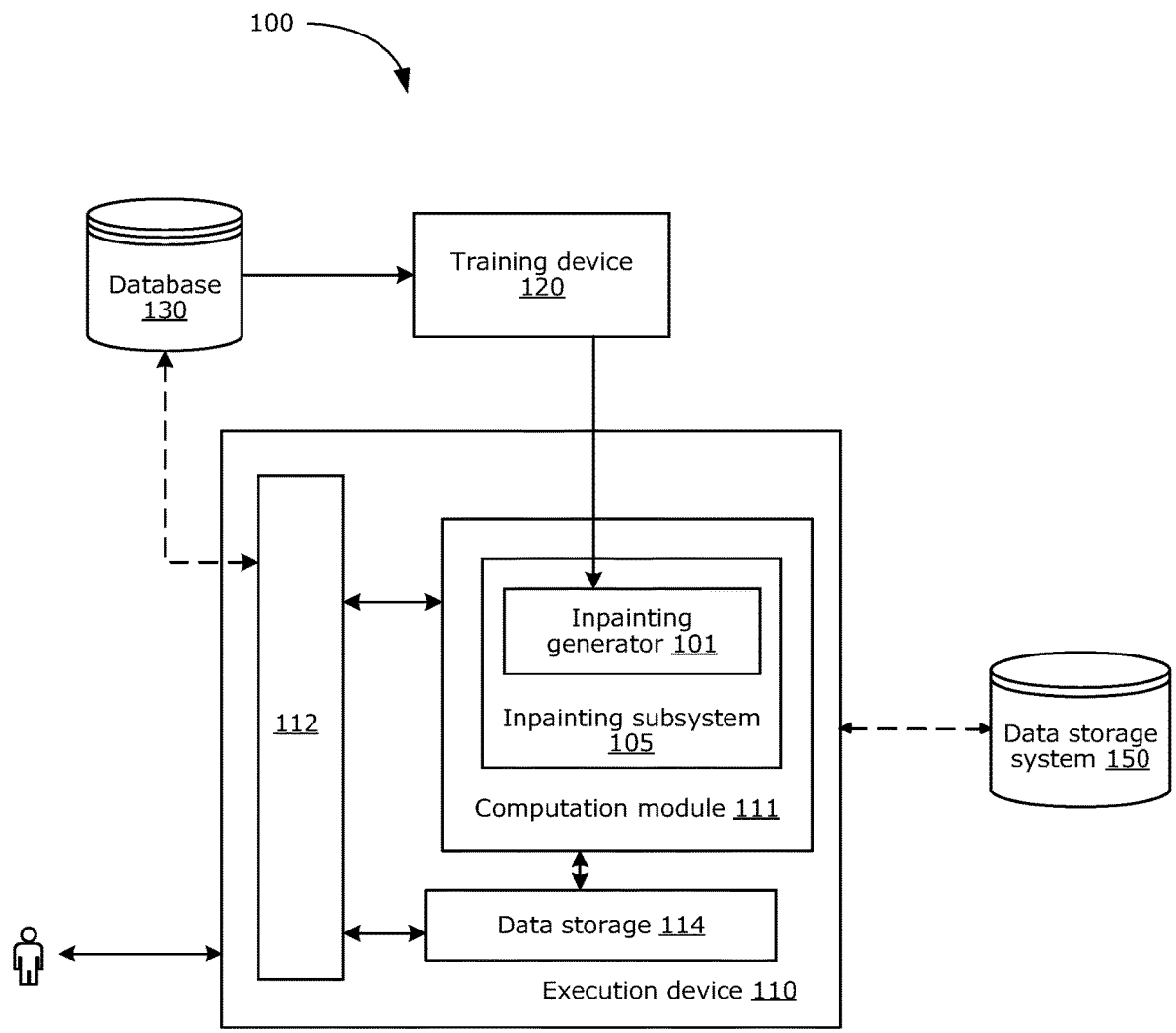
FIG. 1 is a block diagram showing an example system, in accordance with some embodiments of the present disclosure.

The following describes technical solutions of this disclosure with reference to accompanying drawings.

The image inpainting methods and systems described in examples herein may be applied to a scenario in which a high-resolution digital image is to be manipulated by the removal or repositioning of an object in the image. The disclosed methods and systems enable a neural network to be trained using lower resolution images, and the trained neural network may then be used for inpainting of a high-resolution image. Thus, the disclosed methods and systems provide the technical effect that a high-resolution image can be modified, by the removal or repositioning of an object in the image and/or to reconstruct a missing portion, using a machine learning-based technique, without requiring excessive use of memory resources. A further technical effect is that a high-resolution image can be modified, by the removal or repositioning of an object in the image and/or to reconstruct a missing portion, using a machine learning-based technique, on a system having limited resources, such as handheld or mobile devices (e.g., a smartphone, a tablet, or a laptop, among others), as well as desktop devices (e.g., desktop computers, or personal computing devices, among others).

The image inpainting methods and systems described in examples herein may also be applied to a scenario in which a video is to be edited by the removal of an object from multiple frames of the video. Each frame of the video may be processed as a high-resolution image, using the disclosed methods and systems. Thus, a technical effect is that high-resolution image inpainting can be used to edit a video. A further technical effect is that a high-resolution video can be modified, such as by the removal or repositioning of an object in a segment of the video and/or to reconstruct a missing portion in frames of the video, using a machine learning-based technique, on a system having limited resources, such as handheld or mobile devices (e.g., a smartphone, a tablet, or a laptop, among others), as well as desktop devices (e.g., desktop computers, or personal computing devices, among others).

In the present disclosure, the term "high-resolution" refers to digital images (e.g., photographs or video frames) having a large number of pixels (e.g., 1024×1024 pixels, or more). High-resolution images, in the context of the present disclosure, may thus also be considered to be "high-pixel" images. It should be understood that images having a smaller number of pixels (e.g., 512×152 pixels, or fewer) but having a high density of pixels (e.g., 300 pixels per inch (ppi) or higher) are not necessarily considered to be high-resolution images in the context of the present disclosure.

Conversely, the term "low-resolution" refers to digital images (e.g., photographs or video frames) having a small number of pixels (e.g., 512×512 pixels, or fewer). Low-resolution images, in the context of the present disclosure, may thus also be considered to be "low-pixel" images. It should be understood that images having a larger number of pixels (e.g., 1024×1024 pixels, or more) but having a low density of pixels (e.g., 72 ppi or lower) may be considered high-resolution images rather than low-resolution images, in the context of the present disclosure.

To assist in understanding the present disclosure, some existing techniques for image inpainting are now discussed. Some existing techniques are traditional techniques (i.e., not machine learning-based), which may be referred to as "fill-through-copying" techniques. Fill-through-copying explicitly borrows contents or textures from areas surrounding a mission region of an image to fill in missing regions. An example of a fill-through-copying method is a diffusion-based method which propagates local image appearance surrounding the target missing regions, based on the isophote direction field. Another fill-through-copying approach relies on texture synthesis techniques, which fills the missing region by both extending and borrowing textures from surrounding regions. Patch-based algorithms progressively fill pixels in the missing region by searching the image patches from background regions that are the most similar to the pixels along the boundaries of the missing region.

Some existing techniques are machine learning-based techniques, some of which may be referred to as "fill-through-modeling" techniques. The fill-through-modeling approach uses machine learning to learn to model the distribution of content using a large number of training images (e.g., from an external image database). The fill-through-modeling approach is based on the expectation that regions surrounded by similar contexts are likely to possess similar contents. An example of the fill-through-modeling approach is PixelRNN, which uses a two-dimensional Recurrent Neural Network (RNN) to model the pixel-level dependencies along two spatial dimensions. A more general fill-through-modeling approach is to train an encoder-decoder convolutional neural network (CNN) to model the two-dimensional (2D) spatial contents of an image. Rather than modeling the raw pixels, a CNN is trained to learn to model image-wide edge structure or foreground object contours, thus enabling auto-completion of the edge or contours.

Generally, fill-through-copying and fill-through-modeling techniques are effective when an image database contains an image with sufficient visual similarity to the image to be inpainted. However, these techniques tend to perform poorly if the image database does not have (or does not have a sufficient number of) similar examples. Some attempts have been made to combine the two approaches. For example, some existing inpainting techniques use machine learning to learn a model of image content distribution in a data-driven manner while developing rules-based mechanisms to explicitly copy content from background regions.

In various examples, the present disclosure describes an approach that may be referred to as contextual residual aggregation (CRA). In an example disclosed system a neural network model (i.e., a model learned by training a neural network) is provided with a down-sampled (i.e., low-resolution) version of an original high-resolution image to be inpainted. The neural network predicts a low-resolution inpainted image and up-samples the low-resolution inpainted image to yield a large low-frequency (i.e., blurry) inpainted image. High-frequency residuals for the portion to be inpainted are generated by aggregating weighted high frequency residuals from other contextual regions of the image. The aggregated residuals are used, together with the low-resolution inpainted image to obtain a high-resolution inpainted image. Because the neural network is trained on and processes low-resolution images, the cost of memory and computing time is significantly reduced (compared with other neural networks that process high-resolution images directly). Moreover, as the model can be learned using low-resolution images as training data, the need for high-resolution training datasets is alleviated.

In some examples, the present disclosure also describes a technique for gated convolution, referred to herein as light-weight gated convolution (LWGC). LWGC may be used in the neural network described above, which may help to improve computational speed and efficiency. This may provide enable the disclosed examples to be more readily implemented in devices having limited memory and processor resources, such as handheld and mobile devices.

In some examples, the present disclosure describes an example method of training a generator network to learn an image inpainting task. The training method relates to processing of computer vision, and specifically, may be applied to a data processing method such as data training, machine learning, or deep learning, to perform symbolic and formalized intelligent information modeling, extraction, preprocessing, training, and the like on training data (such as low-resolution image data in the context of this disclosure), to obtain a trained generator network as discussed further below. In addition, the present disclosure describes an example method for inpainting a high-resolution image, which may be performed using the foregoing trained generator network. In examples discussed herein, input data (such as a low-resolution image down-sampled from an original high-resolution image) is input to the trained generator network, to obtain output data (such as an inpainted low-resolution image, and attention scores). It should be noted that the training method for the generator network and the inpainting method described herein may be considered aspects based on a same idea, or may be considered as two parts of a system or two stages of an entire procedure: for example, a model training stage and a model application stage.

Generally, examples disclosed herein relate to a large quantity of neural network applications. For ease of understanding, the following describes some concepts relevant to neural networks and some relevant terms that may be related to examples disclosed herein.

A neural network consists of neurons. A neuron is a computational unit that uses $x_s$ and an intercept of 1 as inputs. An output from the computational unit may be:

$$h_{W,b}(x) = f(W^T x) = f\left(\sum_{s=1}^{n} W_s x_s + b\right)$$

where s=1, 2, . . . n, n is a natural number greater than 1, $W_s$ is a weight of $x_s$, b is an offset (i.e. bias) of the neuron and f is an activation function of the neuron and used to introduce a nonlinear feature to the neural network, to convert an input of the neuron to an output. The output of the activation function may be used as an input to a neuron of a following convolutional layer in the neural network. The activation function may be a sigmoid function, for example. The neural network is formed by joining a plurality of the foregoing single neurons. In other words, an output from one neuron may be an input to another neuron. An input of each neuron may be associated with a local receiving area of a previous layer, to extract a feature of the local receiving area. The local receiving area may be an area consisting of several neurons.

A deep neural network (DNN) is also referred to as a multi-layer neural network and may be understood as a neural network that includes a first layer (generally referred to as an input layer), a plurality of hidden layers, and a final layer (generally referred to as an output layer). The "plurality" herein does not have a special metric. A layer is considered to be a fully connected layer when there is a full connection between two adjacent layers of the neural network. To be specific, for two adjacent layers (e.g., the i-th layer and the (i+1)-th layer) to be fully connected, each and every neuron in the i-th layer must be connected to each and every neuron in the (i+1)-th layer.

Processing at each layer of the DNN may be relatively straightforward. Briefly, the operation at each layer is indicated by the following linear relational expression: $\vec{y}=\alpha(W\vec{x}+\vec{b})$, where $\vec{x}$ is an input vector, $\vec{y}$ is an output vector, $\vec{b}$ is an offset vector, W is a weight (also referred to as a coefficient), and $\alpha(.)$ is an activation function. At each layer, the operation is performed on an input vector $\vec{x}$, to obtain an output vector $\vec{y}$.

Because there is a large quantity of layers in the DNN, there is also a large quantity of weights W and offset vectors b. Definitions of these parameters in the DNN are as follows: The weight W is used as an example. In this example, in a three-layer DNN (i.e. a DNN with three hidden layers), a linear weight from a fourth neuron at a second layer to a second neuron at a third layer is denoted as $W_{24}^3$. The superscript 3 indicates a layer (i.e., the third layer (or layer-3) in this example) of the weight W, and the subscript indicates the output is at layer-3 index 2 (i.e., the second neuron of the third layer) and the input is at layer-2 index 4 (i.e., the fourth neuron of the second layer). Generally, a weight from a k-th neuron at an (L−1)-th layer to a j-th neuron at an L-th layer may be denoted as $W_{jk}^L$. It should be noted that there is no W parameter at the input layer.

In a DNN, a greater number of hidden layers may enable the DNN to better model a complex situation (e.g., a real-world situation). In theory, a DNN with more parameters is more complex, has a larger capacity (which may refer to the ability of a learned model to fit a variety of possible scenarios), and indicates that the DNN can complete a more complex learning task. Training of the DNN is a process of learning the weight matrix. A purpose of the training is to obtain a trained weight matrix, which consists of the learned weights W of all layers of the DNN.

A convolutional neural network (CNN) is a DNN with a convolutional structure. The CNN includes a feature extractor consisting of a convolutional layer and a sub-sampling layer. The feature extractor may be considered as a filter. A convolution process may be considered as performing convolution on a two-dimensional (2D) input image or a convolutional feature map using a trainable filter.

The convolutional layer is a layer of neurons at which convolution processing is performed on an input in the CNN. In a convolutional layer, one neuron may be connected only to a subset of neurons (i.e., not all neurons) in neighboring layers. That is, a convolutional layer generally is not a fully connected layer. One convolutional layer usually includes several feature maps, and each feature map may be formed by some neurons arranged in a rectangle. Neurons at a same feature map share weights. The shared weights may be collectively referred to as a convolutional kernel. Typically, a convolutional kernel is a 2D matrix of weights. It should be understood that the convolutional kernel may be unrelated to a manner and position of image information extraction. A hidden principle behind convolutional layers is that statistical information of a part of an image is the same as that of another part of the image. This means that image information learned from one part of the image may also be applicable for another part of the image. A plurality of convolutional kernels may be used at the same convolutional layer to extract different image information. Generally, a larger quantity of convolutional kernels indicates that richer image information is reflected by a convolution operation.

A convolutional kernel may be initialized as a 2D matrix of random values. In a training process of the CNN, the weights of the convolutional kernel are learned. An advantage of using the convolutional kernel to share weights among neurons in the same feature map is that the connections between convolutional layers of the CNN is reduced (compared to the fully connected layer) and the risk of overfitting is lowered.

In the process of training a DNN, a predicted value outputted by the DNN may be compared to a desired target value (e.g., a ground truth value). A weight vector (which is a vector containing the weights W for a given layer) of each layer of the DNN is updated based on a difference between the predicted value and the desired target value. For example, if the predicted value outputted by the DNN is excessively high, the weight vector for each layer may be adjusted to lower the predicted value. This comparison and adjustment may be carried out iteratively until a convergence condition is met (e.g., a predefined maximum number of iterations has been performed, or the predicted value outputted by the DNN is sufficiently converged with the desired target value). A loss function or an objective function is defined, as a way to quantitatively represent how close the predicted value is to the target value. An objective function represents a quantity to be optimized (e.g., minimized or maximized) in order to bring the predicted value as close to the target value as possible. A loss function more specifically represents the difference between the predicted value and the target value, and the goal of training the DNN is to minimize the loss function.

Backpropagation is an algorithm for training a DNN. Backpropagation is used to adjust (also referred to as update) a value of a parameter (e.g., a weight) in the DNN, so that the error (or loss) in the output becomes smaller. For example, a defined loss function is calculated, from forward propagation of an input to an output of the DNN. Backpropagation calculates a gradient of the loss function with respect to the parameters of the DNN, and a gradient algorithm (e.g., gradient descent) is used to update the parameters to reduce the loss function. Backpropagation is performed iteratively, so that the loss function is converged or minimized.

A generative adversarial network (GAN) is a deep learning model, and provides another technique for training a DNN. A GAN includes at least two modules: one module is a generative model (also referred to as a generator), and the other module is a discriminative model (also referred to as a discriminator). These two models compete with each other and learn from each other, so that a better output is generated. The generator and the discriminator may both be neural networks, and may be specifically DNNs, or CNNs.

A basic principle of the GAN is now described, using the example of photo generation. The generator is a network that is learning to perform the task of producing a synthetic photo. The generator receives a random noise z as input, and generates an output, denoted by G(z). The discriminator is a network that is learning to discriminate whether a photo is a real-world photo. The discriminator receives the input x, where x represents a possible photo. An output D(x) generated by the discriminator represents the probability that x is a real-world photo. If D(x) is 1, it indicates that x is absolutely a real-world photo. If D(x) is 0, it indicates that x absolutely is not a real-world photo. In training the GAN, an objective of the generator is to generate a photo as real as possible (to avoid detection by discriminator), and an objective of the discriminator is to try to discriminate between a real-world photo and the photo generated by the generator. Thus, training constitutes a dynamic adversarial process between the generator and the discriminator. The aim of the training is for the generator to learn to generate a photo that the discriminator cannot discriminate from a real-world photo (ideally, D(G(z))=0.5). The trained generator is then used for model application, which is generation of a synthetic photo in this example.

Reference is made to FIG. 1, which shows an example embodiment of the present disclosure as a system architecture 100. The following description shall not be construed as a limitation to any examples of this disclosure. As shown in the system architecture 100, training data may be stored in a database 130. In the context of the present disclosure, training data may include low-resolution images (e.g., images up to size 512×512 pixels, or smaller) which are not necessarily labeled. The database 130 may contain, for example, training datasets that have been previously collected and commonly used for training models related to image tasks (e.g., image recognition). The database 130 may alternatively or additionally contain images optionally collected (e.g., with user consent) from an execution device 110 (which may be a user device). For example, photographs and/or videos captured by and stored on the execution device 110 may optionally be anonymized and uploaded to the database 130.

As will be discussed further below, training of an inpainting generator 101 may be performed using a training device 120, using the training data maintained in the database 130. The trained inpainting generator 101 may be used to implement a method for inpainting of high-resolution images, according to examples disclosed herein. The training device 120 may use samples of the training data stored in the database 130 to train the inpainting generator 101. Additionally or alternatively, the training device 120 may train the inpainting generator 101 using training data obtained from other sources, such as a distributed storage (or cloud storage platform).

The inpainting generator 101 obtained through training by the training device 120 may be applied to different systems or devices. For example, the inpainting generator 101 may be applied to an inpainting subsystem 105 in a computation module 111 of an execution device 110. Although FIG. 1 illustrates an example in which the training device 120 is separate from the execution device 110, it should be understood that the present disclosure is not limited to this embodiment. In some examples, there may not be separate training device 120 and execution device 110. That is, training of the inpainting generator 101 and application of the trained inpainting generator 101 may be at the same device.

The execution device 110 may be a user device, for example, a client terminal, a mobile terminal, a tablet computer, a notebook computer, an augmented reality (AR) device, virtual reality (VR) device, or an in-vehicle terminal, among other possibilities. The execution device 110 may also be a server, a cloud computing platform, or the like, which may be accessed by a user via a user device. In FIG. 1, the execution device 110 is provided with an I/O interface 112, which is configured to perform data interaction with an external device. For example, the execution device 110 may provide upload data (e.g., image data, such as photographs and/or videos captured by the execution device 110) to the database 130 via the I/O interface 112. Although FIG. 1 illustrates an example in which the user directly interacts with the execution device 110, it should be understood that the present disclosure is not limited to this embodiment. In some examples, there may be a user device separate from execution device 110, and the user interacts with the user device that in turn communicates data to/from the execution device 110 via the I/O interface 112.

The execution device 110 in this example includes a data storage 114, which may be a system memory (e.g., a random access memory (RAM), a read-only memory (ROM), etc.) or a mass storage device (e.g., a solid state drive, a hard disk drive, etc.). The data storage 114 may store data accessible by the computation module 111. For example, the data storage 114 may store captured images and/or inpainted images on the execution device 110, separately from the computation module 111.

In some examples, the execution device 110 may optionally invoke data, code, or the like from an external data storage system 150, to perform processing, or may store, in the data storage system 150, data, an instruction, or the like obtained through corresponding processing.

It should be noted that FIG. 1 is merely a schematic diagram of an example system architecture 100 according to an embodiment of the present disclosure. Relationships and interactions between the device, the component, the module, and the like that are shown in FIG. 1 are not intended to be limiting to the present disclosure.

Figure 2:
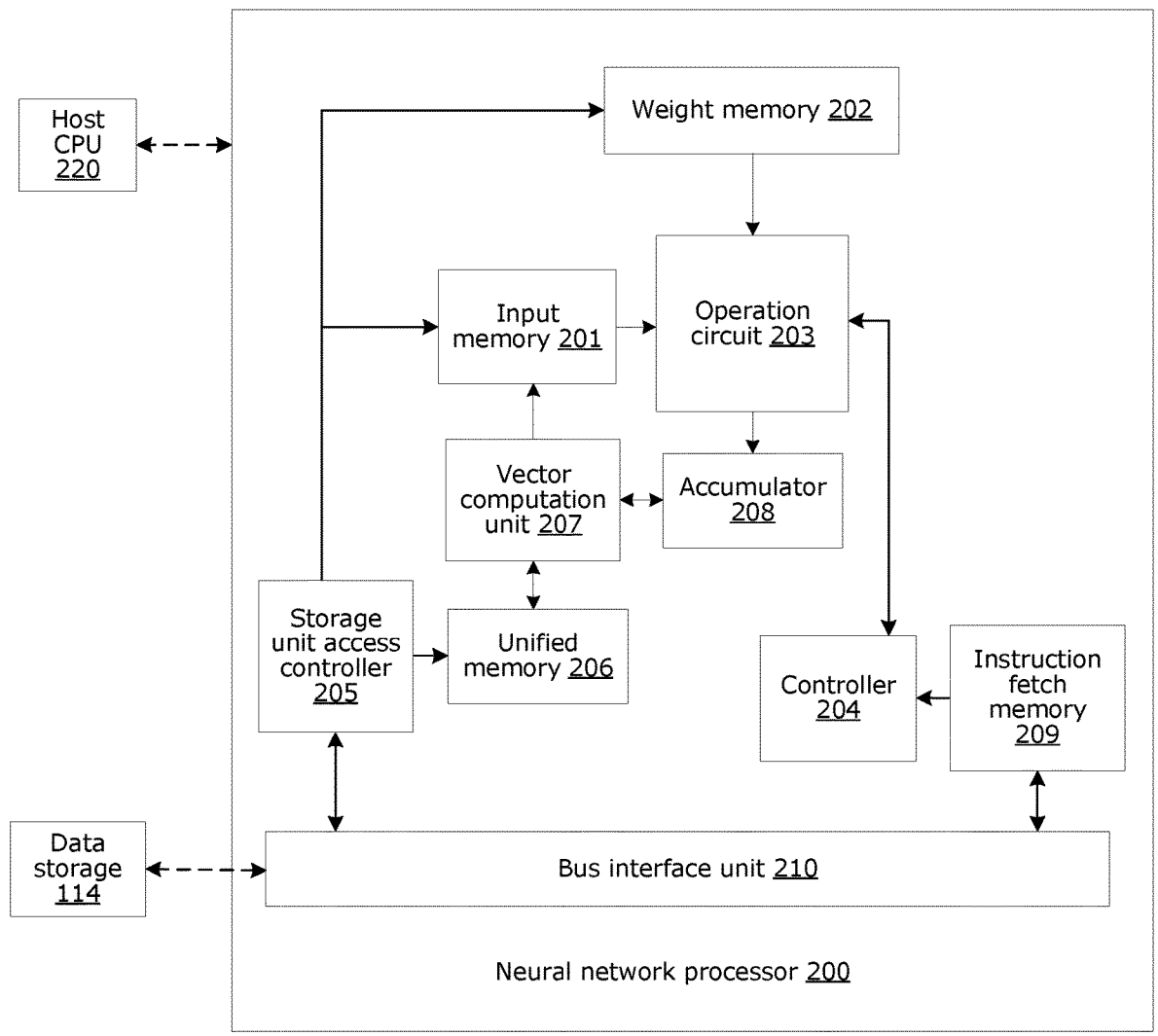
FIG. 2 is a block diagram illustrating an example hardware structure for a neural network processor, in accordance with some embodiments of the present disclosure.

FIG. 2 is a block diagram illustrating an example hardware structure of an example neural network processor 200 according to an embodiment of the present disclosure. The neural network processor 200 may be provided on an integrated circuit (also referred to as a computer chip). The neural network processor 200 may be provided in the execution device 110 shown in FIG. 1, to perform computation for the computation module 111 and to implement the inpainting subsystem 105. Additionally or alternatively, the neural network processor 200 may be provided in the training device 120 shown in FIG. 1, to perform training of the inpainting generator 101. All the algorithms of the layers of a neural network (e.g., the neural network in the inpainting generator 101, discussed further below) may be implemented in the neural network processor 200.

The neural network processor 200 may be any processor that is capable of performing the computations required in a neural network (e.g., to compute massive exclusive OR operations). For example, the neural network processor 200 may be a neural processing unit (NPU), a tensor processing unit (TPU), a graphics processing unit (GPU), or the like. The neural network processor 200 may be a coprocessor to an optional host central processing unit (CPU) 220. For example, the neural network processor 200 and the host CPU 220 may be mounted on the same package. The host CPU 220 may be responsible for performing core functions of the execution device 110 (e.g., execution of an operating system (OS), managing communications, etc.). The host CPU 220 may manage operation of the neural network processor 200, for example by allocating a task to the neural network processor 200.

The neural network processor 200 includes an operation circuit 203. A controller 204 of the neural network processor 200 controls the operation circuit 203 to, for example, extract data (e.g., matrix data) from an input memory 201 and a weight memory 202 of the neural network processor 200, and perform data operations (e.g., addition and multiplication operations).

In some examples, the operation circuit 203 internally includes a plurality of processing units (also referred to as process engines (PEs)). In some examples, the operation circuit 203 is a bi-dimensional systolic array. In other examples, the operation circuit 203 may be a uni-dimensional systolic array or another electronic circuit that can implement a mathematical operation such as multiplication and addition. In some examples, the operation circuit 203 is a general matrix processor.

In an example operation, the operation circuit 203 obtains, from the weight memory 202, weight data of a weight matrix B, and caches the weight data in each PE in the operation circuit 203. The operation circuit 203 obtains, from the input memory 201, input data of an input matrix A and performs a matrix operation based on the input data of the matrix A and the weight data of the matrix B. An obtained partial or final matrix result is stored in an accumulator 208 of the neural network processor 200.

In this example, the neural network processor 200 includes a vector computation unit 207. The vector computation unit 207 includes a plurality of operation processing units. If needed, the vector computation unit 207 performs further processing, for example, vector multiplication, vector addition, an exponent operation, a logarithm operation, or magnitude comparison, on an output from the operation circuit 203 (which may be retrieved by the vector computation unit 207 from the accumulator 208). The vector computation unit 207 may be mainly used for computation at a non-convolutional layer or fully-connected layer of a neural network. For example, the vector computation unit 207 may perform processing on computation such as pooling or normalization. The vector computation unit 307 may apply a nonlinear function to an output of the operation circuit 203, for example, a vector of an accumulated value, to generate an activation value, which may be used by the operation circuit 203 as activation input for a next layer of a neural network. In some examples, the vector computation unit 207 generates a normalized value, a combined value, or both a normalized value and a combined value.

The neural network processor 200 in this example includes a storage unit access controller 205 (also referred to as a direct memory access control (DMAC)). The storage unit access controller 205 is configured to access a memory external to the neural network processor 200 (e.g., the data storage 114 of the execution device 110) via a bus interface unit 210. The storage unit access controller 205 may access data from the memory external to the neural network processor 200 and transfer the data directly to one or more memories of the neural network processor 200. For example, the storage access unit controller 205 may directly transfer weight data to the weight memory 202, and may directly transfer the input data to a unified memory 206 and/or the input memory 201. The unified memory 206 is configured to store input data and output data (e.g., a processed vector from the vector computation unit 207).

The bus interface unit 210 is also used for interaction between the storage access unit controller 205 and an instruction fetch memory (also referred to as an instruction fetch buffer) 209. The bus interface unit 210 is further configured to enable the instruction fetch memory 209 to obtain an instruction from a memory external to the neural network processor 200 (e.g., the data storage 114 of the execution device 110). The instruction fetch memory 209 is configured to store the instruction for use by the controller 204.

Generally, the unified memory 206, the input memory 201, the weight memory 202, and the instruction fetch memory 209 are all memories of the neural network processor 200 (also referred to as on-chip memories). The data storage 114 is independent from the hardware architecture of the neural network processor 200.

Figure 3:
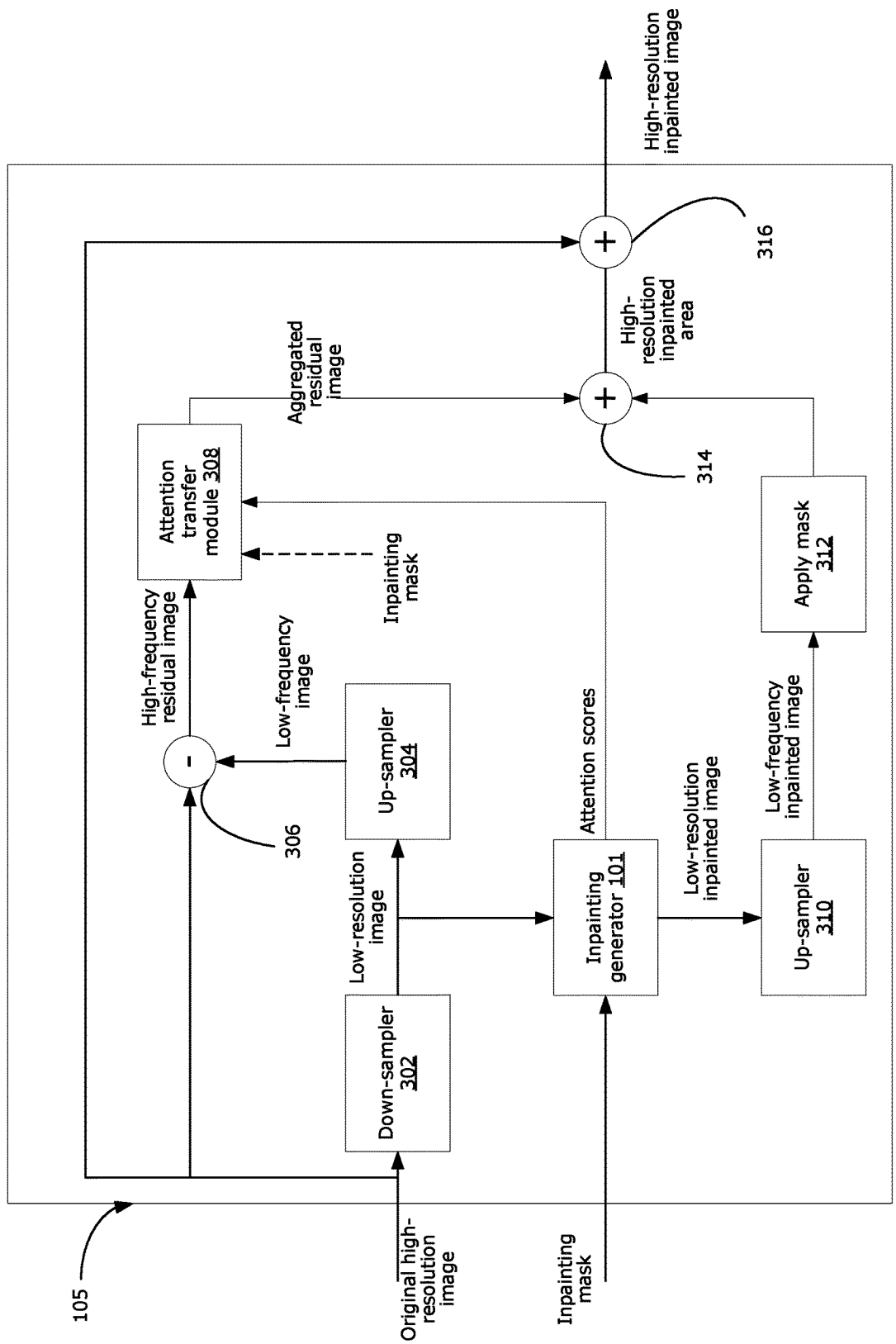
FIG. 3 is a block diagram illustrating an example of high-resolution image inpainting using a trained inpainting generator, in accordance with some embodiments of the present disclosure.

FIG. 3 is a block diagram illustrating operations for inpainting of a high-resolution image, performed by the inpainting subsystem 105 according to an embodiment of the present disclosure. The inpainting subsystem 105 includes the inpainting generator 101, which is trained (e.g., using the training device 120) as discussed further below.

The inpainting subsystem 105 receives an original high-resolution image as an input. The original high-resolution image may, for example, be a photograph or video frame(s) captured by the execution device 110. The original high-resolution image may have a resolution of 1024×1024 pixels, up to 8K resolution, or higher, for example. The inpainting subsystem 105 also receives an inpainting mask as an input. The inpainting mask is a 2D matrix containing binary data (e.g., each entry in the matrix has a value of either "1" or "0"). The binary data of the inpainting mask may have a one-to-one mapping with a corresponding pixel in the original high-resolution image, such that the inpainting mask may have dimensions matching the pixel dimension of the original high-resolution image. The inpainting mask indicates which portion(s) of the original high-resolution image is to be inpainted (e.g., the pixel(s) of the original high-resolution image corresponding to entry(ies) of the inpainting mask having a value of "0" may be the pixel(s) to be inpainted). The portion(s) of the original high-resolution image to be inpainted may be referred to herein as the inside-mask area, and the portion(s) of the original high-resolution image that is not inpainted may be referred to herein as the outside-mask area.

The inpainting subsystem 105 is configured to, at a down-sampler operation 302, down-sample the inputted original high-resolution image to generate a low-resolution image (e.g., 512×512 pixels, or smaller). The down-sampler operation 302 may be performed using any suitable down-sampling technique, such as nearest-neighbor down-sampling, bilinear down-sampling, bicubic down-sampling or averaging down-sampling. In some examples, the down-sampler operation 302 may be performed using averaging, which evenly divides the original high-resolution image into equal-sized regions (each equal-sized region corresponding to a respective pixel of the low-resolution image generated by the down-sampling) and averages all pixels in each region to obtain a pixel value for the corresponding pixel of the low-resolution image.

The low-resolution image is up-sampled, at a first up-sampler operation 304, to generate a low-frequency (i.e., blurry) image of the same pixel size and dimension as the original high-resolution image. The first up-sampler operation 304 may be performed using any suitable up-sampling technique, such as nearest-neighbor up-sampling, bilinear up-sampling, or bicubic up-sampling. In some examples, the first up-sampler operation 304 may be performed using bilinear up-sampling.

The up-sampled low-frequency image is pixel-wise subtracted from the original high-resolution image, at a subtraction operation 306, to obtain a high-frequency residual image. The high-frequency residual image may be a 2D matrix that has dimensions corresponding to the dimensions of the original high-resolution image (e.g., the high-frequency residual image may be a 2D image having the same pixel size and dimension as the original high-resolution image). Each pixel in the high-frequency residual image corresponds to a respective pixel in the original high-resolution image. The high-frequency residual image contains the high-frequency component of the original high-resolution image. The high-frequency residual image provides high-frequency information about the outside-mask area (i.e., contextual residual information) for computing the high-frequency information for the inside-mask area.

It should be noted that the portion of the high-frequency residual image corresponding to the inside-mask area is not used and may be discarded. Optionally, the inpainting mask (which was provided as input to the inpainting subsystem 105) may be applied to the output of the subtraction operation 306 such that the high-frequency residual image contain valid entries corresponding only to the outside-mask area. Pixel values of the high-frequency residual image corresponding to the inside-mask area may be set to an invalid value, a null value or a "0" value.

The low-resolution image is also received by the inpainting generator 101, the details of which are discussed further below. The inpainting generator 101 generates a low-resolution inpainted image and a set of attention scores. The attention scores represent the similarity between each pixel in the outside-mask area and each pixel in the inside-mask area. The attention scores may be considered to provide contextual attention information, and represents the "attention" or weight to be applied to a given outside-mask pixel when computing a given inside-mask pixel.

The low-resolution inpainted image from the inpainting generator 101 is up-sampled, by a second up-sampler operation 310, to generate a low-frequency inpainted image. The low-frequency inpainted image has the same pixel size and dimension as the original high-resolution image. The second up-sampler operation 310 should perform up-sampling using the same technique as the first up-sampler operation 304 (e.g., both using bilinear up-sampling).

The attention scores from the inpainting generator 101 and the high-frequency residual image from the subtraction operation 308 are received by a first attention transfer module 308. The first attention transfer module 308 may optionally also receive the inpainting mask (which was provided as input to the inpainting subsystem 105), to indicate the inside-mask area. In some examples, the first attention transfer module 308 may not be provided with the inpainting mask. Instead, the attention scores may implicitly indicate the inside-mask area because calculation of the attention scores (discussed further below) may result in attention scores having values of zero for attention transfer from inside-mask area to outside-mask area (or from inside-mask area to another inside-mask area). In some examples, it may not be necessary for the first attention transfer module 308 to be provided with the inpainting mask because the high-frequency residual image may have been computed using the inpainting mask (e.g., the inpainting mask may have been used at the subtraction operation 306) such that there is only high-frequency residual information for only the outside-mask region.

The first attention transfer module 308 applies the attention scores to the high-frequency residual image to compute an aggregated residual image, which contains high-frequency residual information for the inside-mask area, calculated using the high-frequency residual information for the outside-mask area. Further details about the attention scores and the first attention transfer module 308 are provided below.

The inpainting mask is applied to the low-frequency inpainted image, at an apply mask operation 312, to obtain the low-frequency inpainted area only for the inside-mask area. The aggregated residual image is added to the low-frequency inpainted inside-mask area, at a first addition operation 314. The result is a high-resolution inpainted area, which contains pixel information only for the inside-mask area. That is, the result is an image of the same pixel size and dimensions of the original high-resolution image, but having valid or non-zero pixel values only for those pixels belonging to the inside-mask area.

The high-resolution inpainted area is added to the original high-resolution image, at a second addition operation 316. The resolution of the second addition operation 316 is a high-resolution inpainted image, which is the output from the inpainting subsystem 105. The high-frequency inpainted image may be provided to be displayed to a user of the execution device 110 and/or stored in the data storage 114 of the execution device 110, for example.

The inpainting subsystem 105 may be understood to use contextual information (i.e., information from the outside-mask area) from not only features but also high-frequency residuals of the outside-mask area, to enable high-resolution inpainting of the inside-mask area. In particular, contextual attention is used in calculating attention scores based on the affinity between sections of inside-mask and outside-mask areas. In this way, contextually relevant features and residuals from the outside-mask can be transferred into the inside-mask area. Further details of selected blocks shown in FIG. 3 are now discussed.

Figure 4:
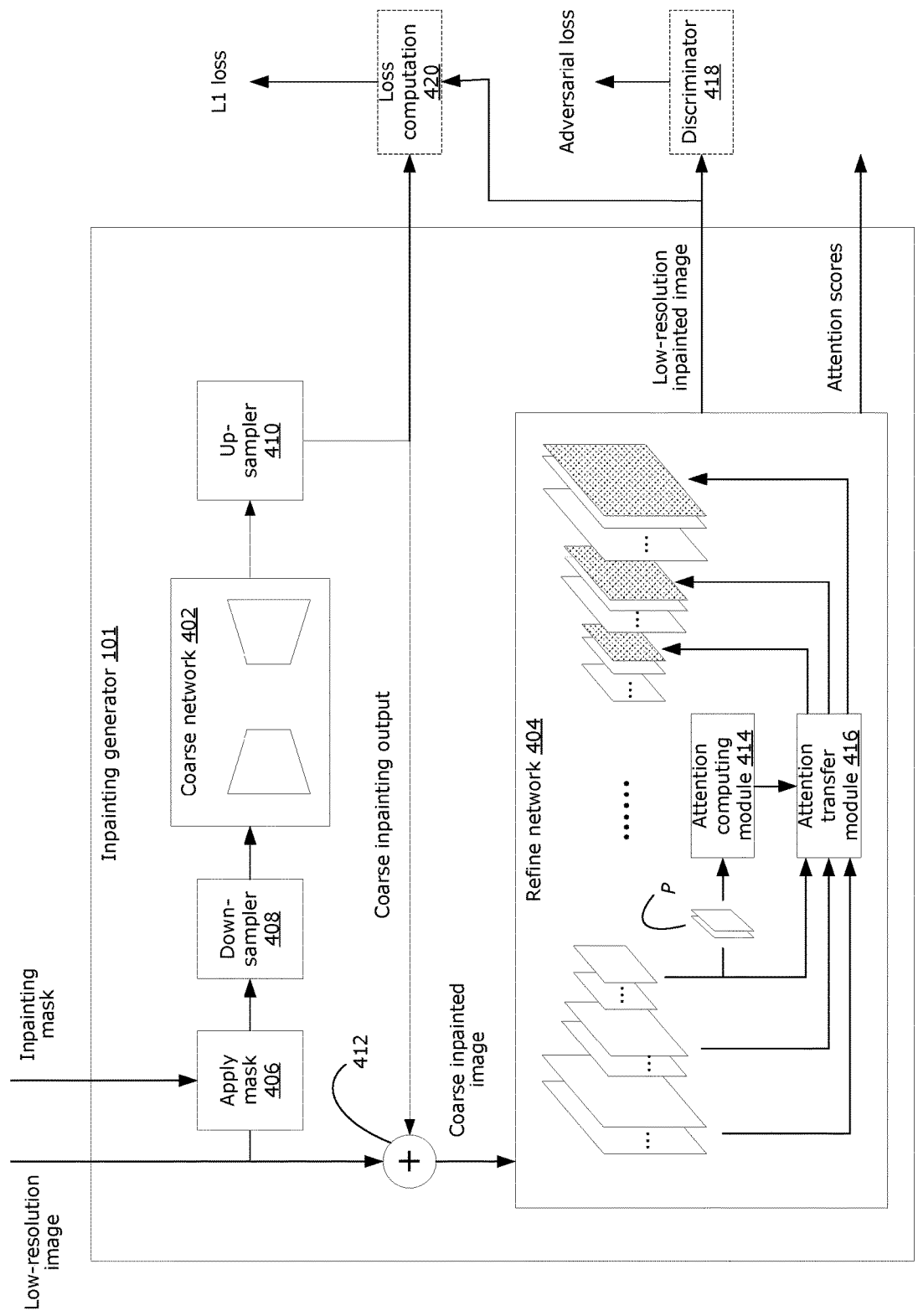
FIG. 4 illustrates some implementation details of an example inpainting generator, in accordance with some embodiments of the present disclosure.

FIG. 4 illustrates details of an example inpainting generator 101 for generating a low-resolution inpainted image, according to an embodiment of the present disclosure.

The inpainting generator 101 is based on a two-stage coarse-to-fine framework including a coarse network 402 that generates coarse inpainting output, and a refine network 404 that refines the coarse inpainting output to generate the low-resolution inpainted image that is ultimately outputted by the inpainting generator 101. In this example, both the coarse network 402 and the refine network 404 have respective encoder-decoder CNN architectures.

Inputs to the inpainting generator 101 are the low-resolution image (from the down-sampler 302 in FIG. 3) and the inpainting mask (which is part of the input to the inpainting subsystem 105. The resolution (in terms of pixel size and dimension) of the output low-resolution inpainted image is the same as that of the input low-resolution image. For example, if the input low-resolution image has a resolution of 512×512 pixels, then the output low-resolution inpainted image also has a resolution of 512×512 pixels.

The operation of the coarse network 402 is described first. The inpainting mask (with appropriate resizing if necessary to correctly map onto the low-resolution image) is applied to the low-resolution image, at an apply mask operation 406. This blanks out the inside-mask area of the low-resolution image. In order to enlarge the perceptive fields and reduce computation at the coarse network 402, the masked low-resolution image is further down-sampled, at a second down-sampler operation 408 to an even lower resolution image (e.g., 256×256 pixels, or smaller). The second down-sampler operation 408 may be performed using any suitable down-sampling technique, as discussed above. For example, the second down-sampler operation 408 may use the same technique as the first down-sampler operation 302 previously described. The output of the second down-sampler operation 408 is provided as input to the coarse network 402. The coarse network 402 has a plurality of layers that encode the input to a feature map in a latent feature space, and a plurality of layers that decode the feature map to generate a predicted inpainting output in which the inside-mask area has been inpainted. The output of the coarse network 402 is up-sampled by a third up-sampler operation 410, to provide the coarse inpainting output that is fed to the refine network 404. The third up-sampler operation 410 is performed so that the coarse inpainting output matches the pixel size and dimension (e.g., 512×512 pixels) of the low-resolution image that was inputted to the inpainting generator 101. The third up-sampler operation 410 may use any suitable up-sampling technique, as discussed above. For example, the third up-sampler operation 410 may use the same technique as the first and second up-sampler operations 304, 310 previously described.

The coarse inpainting output is added to the low-resolution image at an addition operation 412, to replace the inside-mask area of the low-resolution image with the coarse inpainting output. The resulting coarse inpainted image is provided as input to the refine network 404. It should be noted that the refine network 404 operates on a higher resolution input image than the coarse network 402. The refine network 404 has a plurality of encoding layers, and a plurality of decoding layers. In the example shown, there are three encoding layers and correspondingly there are three decoding layers in the refine network 404. Each encoding layer of the refine network 404 maps its respective input to a respective feature map, denoted as $P^l$ where l is the index of the encoding layer (with l=1 being the most shallow layer). Each feature map $P^l$ is of a different size and encodes feature information of a respective different contextual scope, with the most shallow layer producing the largest (e.g., 256×256 entries, depending on the convolutional kernel used) feature map $P^1$ encoding lowest-level (i.e., smallest scope) features and the deepest layer producing the highest-level feature map (denoted simply P) that is the smallest (e.g., 32×32 entries, depending on the convolutional kernel used) and that encodes the highest-level features.

The highest-level feature map P is provided as input to an attention computing module 414, which computes contextual attention scores using the highest-level feature map. The attention scores are provided as input to a second attention transfer module 416, which performs attention transfer on each lower-level feature map $P^l$, and outputs respective contextualized feature maps. The contextualized feature maps (indicated in FIG. 4 by different shading) are concatenated to the respective feature map $P^l$ for decoding by the decoding layers. Thus, more distant contextual information can be encoded at multiple abstraction levels. The output of the decoding layers is the low-resolution inpainted image, which is also the ultimate output of the inpainting generator 101. The attention scores calculated by the attention computing module 414 are also outputted by the inpainting generator 101.

As will be discussed further below, the neural networks of the inpainting generator 101 may be implemented in various ways, to help improve computational efficiency and/or output quality. In some instances, there may be a trade-off between efficiency and quality. For example, dilated convolutions may be used in one or more convolutional layers of the coarse network 402 and/or the refine network 404, to further expand the size of the receptive fields. Further, the present disclosure describes a technique, referred to herein as light-weight gated convolution (LWGC), which may be used in one or more convolutional layers of the coarse network 402 and/or the refine network 404, to further improve computational efficiency. Other implementation considerations include using equal padding and exponential linear units (ELUs) as activation for all convolution layers, and/or removing the batch normalization layer (since this layer may deteriorate color coherency).

Figure 5:
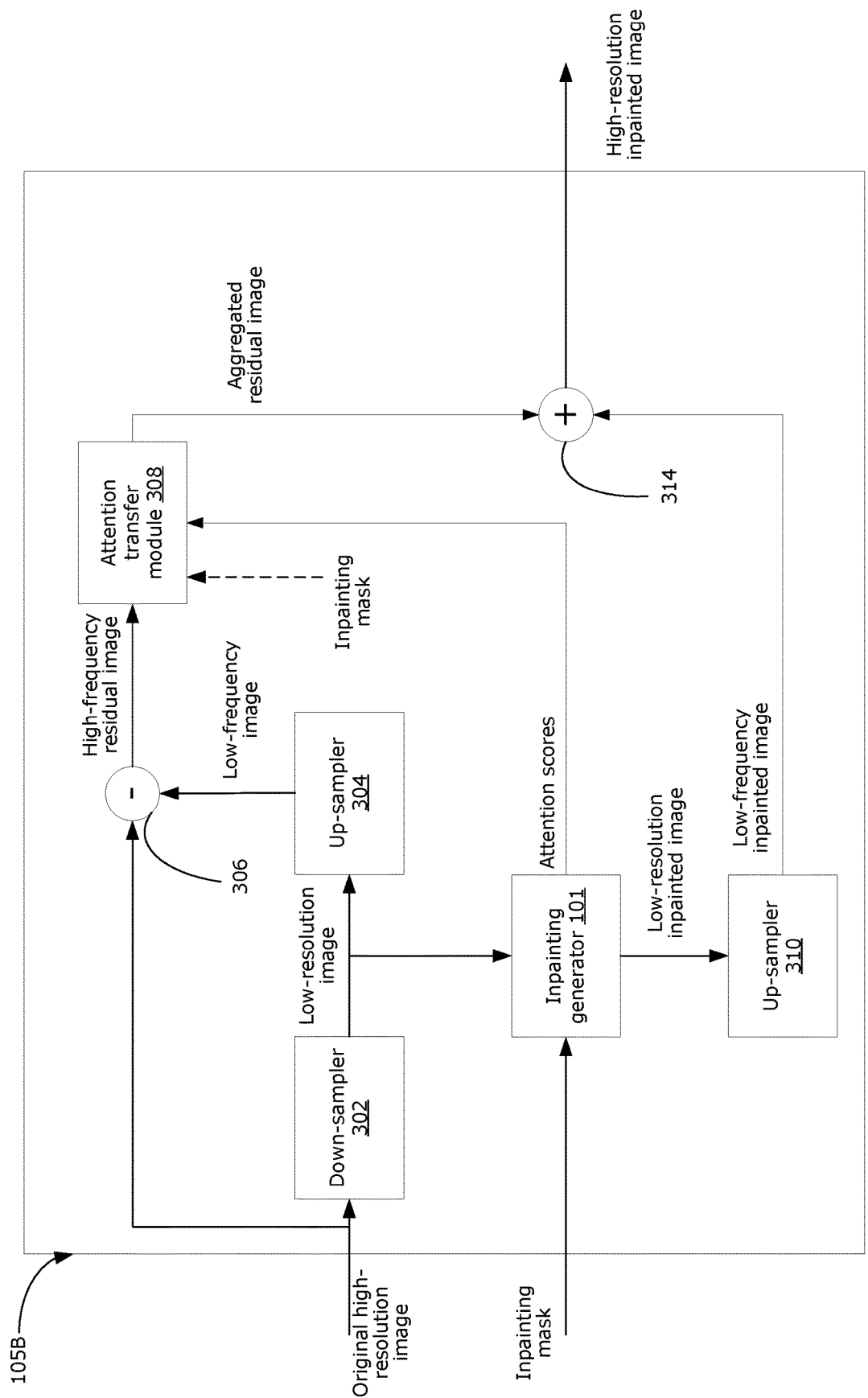
FIG. 5 is a block diagram illustrating another example of high-resolution image inpainting using a trained inpainting generator, in accordance with some embodiments of the present disclosure.

FIG. 5 is a block diagram illustrating operations for inpainting of a high-resolution image, performed by the inpainting subsystem 105B according to another embodiment of the present disclosure. The inpainting subsystem 105B of FIG. 5 is a variation of the inpainting subsystem 105 of FIG. 3.

In the inpainting subsystem 105B of FIG. 5, the aggregated residual image output from the first attention transfer module 308 includes high-frequency information for both inside-mask and outside-mask areas (unlike in FIG. 3, in which the aggregated residual image includes high-frequency information only for the inside-mask area). The aggregated residual image is of the same pixel size and dimensions as the original high-resolution image. The low-resolution inpainting image generated by the inpainting generator 101 is up-sampled at the second up-sampler operation 310, to obtain a low-frequency inpainted image. The low-frequency inpainted is then added directly to the aggregated residual image, to output the high-resolution inpainted image. It should be understood that aside from the differences specifically mentioned above, the details of the inpainting subsystem 105B of FIG. 5 may be substantially the same as the inpainting subsystem 105 of FIG. 3.

The inpainting subsystem 105B of FIG. 5 may be simpler to implement than the inpainting subsystem 105 of FIG. 3. However, the inpainting subsystem 105 of FIG. 3 may be more computationally efficient than the inpainting subsystem 105B of FIG. 5. Regardless, both embodiments of the inpainting subsystem 105, 105B enable generation of a high-resolution inpainted image of sufficiently good quality, using fewer computing and memory resources than most existing high-resolution inpainting techniques.

Operation of the attention computing module 414 and the second attention transfer module 416 are now described.

At the attention computing module 414, attention scores are calculated based on region affinity, based on the highest-level feature map P. The highest-level feature map P is divided (e.g., evenly divided) into a plurality of regions (or patches), denoted as lowercase p. The attention computing module 414 calculates the similarity between regions corresponding to the outside-mask area (denoted as $p_i$ for the i-th outside-mask region) and regions corresponding to the inside-mask area (denoted as $p_j$ for the j-th inside-mask region). For example, the similarity score, denoted as $s'_{i,j}$, between the i-th outside-mask region and the j-th inside mask region may be calculated using cosine similarity, as follows:

$$s'_{i,j} = \left\langle \frac{p_i}{\|p_i\|}, \frac{p_j}{\|p_j\|} \right\rangle$$

A softmax function is then applied on the similarity scores to obtain the attention score, denoted as $s_{i,j}$, between the i-th outside-mask region and the j-th inside mask region as follows:

$$s_{i,j} = \frac{e^{s'_{i,j}}}{\sum_{i=1}^{N} e^{s'_{i,j}}}$$

where N is the number of regions belonging to the outside-mask area.

For example, for a highest-level feature map P of size 32×32, each region p may be of size 3×3, thus a total number of 1024 regions can be extracted from the highest-level feature map P. It should be understood that the number of inside-mask regions may vary for different sizes, dimensions and shapes of inpainting masks. The attention scores may be stored in a temporary attention matrix. The attention matrix may be sized to enable storing of attention scores between any possible pair of regions. For example, if there is a total number of 1024 regions, then the attention matrix may be of size 1024×1024 (although typically only a fraction of entries will actually represent a pair of inside-mask and outside-mask regions).

The computed attention scores are used by the second attention transfer module 416 to generate the contextual feature maps for each level of feature map. At the second attention transfer module 416, each lower-level feature map $P^l$ is divided into a respective plurality of regions, denoted by lowercase $p^l$, corresponding to the regions p extracted from the highest-level feature map P. It should be noted that the regions $p^l$ are of different sizes corresponding to the size of each respective lower-level feature map $P^l$, but the regions defined for each feature map should map onto each other.

The second attention transfer module 416 uses the attention scores to generate contextualized regions to fill in the inside-mask area of each lower-level feature map $P^l$. This may be performed using a weighted aggregation operation, where the attention scores are used as the weights. For example, to generate the j-th contextualized inside-mask region for the l-th layer feature map, the following calculation may be performed:

$$P_j^l = \Sigma_{i=1}^{N} s_{i,j} p_i^l$$

where l is the layer number (e.g., l ∈ 1,2,3) and $p_i^l$ is the i-th outside-mask area of the feature map $P^l$. N indicates the number of regions belonging to the outside-mask area.

The contextualized inside-mask regions are used to generate the contextualized feature map for each layer. Because the size of the feature maps vary by layer, the size of the regions should vary accordingly. Further, there should be at least one region for each attention score. For example, if the feature map for a given lower-level layer has a size of 128×128, and the attention scores are computed from 32×32 regions of the highest-level feature map, then the region sizes for the given lower-level feature map should be greater or equal to $(128/32)^2=4^2$ (i.e., each region should be of size at least 4×4). If the region size is larger, then there may be overlapping regions, which is acceptable because the following layers of the neural network can learn to adapt. Although the dimensions described in this example are all square (i.e., equal height and width), it should be understood that the present disclosure is not limited to this, and other non-square geometries may be used.

The second attention transfer module 416 applies the attention score to multiple layers, using the same set of attention scores. The sharing of attention scores means that fewer parameters need to be used in the neural network, which may lead to better efficiency in terms of memory and computational speed.

It should be understood that the first attention transfer module 308 outside of the inpainting generator 101 may operate similarly to the second attention transfer module 416 within the inpainting generator 101, but applying the attention score to the high-frequency residual image instead of feature maps. The high-frequency residual image is divided into a plurality of regions, the number of regions being equal or greater than the number of attention scores. The high-frequency residual image may be divided into regions that are sized to enable all pixels to be covered by the regions without overlapping. This may ensure that the high-frequency residual information for the inside-mask regions can be accurately calculated using the outside-mask regions.

The first attention transfer module 308 calculates the high-frequency residual information for each inside-mask region, using the high-frequency residual information from the outside-mask regions as context. For example, a weighted aggregation may be calculated, using the attention score as weights, according to the following:

$$R_j = \Sigma_{i=1}^{N} s_{i,j} R_i$$

where R denotes the high-frequency residual image, $R_i$ is the i-th outside-mask region of the high-frequency residual image, and $R_j$ is j-th inside-mask region. The output of the first attention transfer module 308 is the aggregated residual image.

As mentioned above, in some examples, the inpainting generator 101 may use LWGC for one or more convolutional layer. Gated convolution is a technique in which two different sets of convolution weights are applied to a single gated convolutional layer to generate two separate convolutional outputs. A set of gate weights, denoted as $W_g$, is used to compute a set of gate values; and a set of feature weights, denoted as $W_f$, is used to compute a set of features for the layer. The gate values are used as input to a gating function, to enable dynamic control of what information from the computed set of features is passed to the next layer.

Gated convolution has been considered in some existing solutions to enable inpainting of irregular areas. However, gated convolution almost doubles the number of parameters and processing time required to compute one layer, compared to regular (i.e., non-gated) convolution. The present disclosure describes a form of gated convolution, referred to herein as light weight gated convolution (LWGD), which may enable the benefits of gated convolution to be realized while reducing the number of parameters and processing time required by conventional gated convolution.

First, some terminology is introduced. A conventional gated convolutional layer may be described using the following:

$$G=\text{conv}(W_g, I)$$

$$F=\text{conv}(W_f, I)$$

$$O=\sigma(G)\odot\psi(F)$$

where I is the set of inputs to the gated convolutional layer, G is the set of gate values, F is the set of feature values, O is the gated output of the gated convolutional layer, $\sigma$ is the Sigmoid function (used as the gating function), and $\psi$ is the activation function (e.g., ELU). It may be noted that the output values of the Sigmoid function are within [0, 1]. Thus, gated convolution enables the neural network to learn a dynamic feature selection mechanism.

The present disclosure describes three different variations of LWGC, which are referred to herein as depth-separable LWGC (denoted as $LWGC^{ds}$), pixel-wise LWGC (denoted as $LWGC^{pw}$), and single-channel LWGC (denoted as $LWGC^{sc}$). LWGC differ from conventional gated convolution in how the set of gate values are calculated. The computation for $LWGC^{ds}$, $LWGC^{pw}$ and $LWGC^{sc}$ may be respectively expressed as follows:

$$G=\text{conv}^{depth\text{-}separable}(W_g, I)$$

$$G=\text{conv}^{pixel\text{-}wise}(W_g, I)$$

$$G^{single\text{-}channel}=\text{conv}(W_g, I)$$

Specifically, denoted as $LWGC^{ds}$ employs a depth-wise convolution (denoted as $\text{conv}^{depth\text{-}separable}$) followed by a 1×1 convolution to compute the gate values G. $LWGC^{pw}$ uses a pixel-wise or 1×1 convolution (denoted as $\text{conv}^{pixel\text{-}wise}$) to compute the gate values G. $LWGC^{sc}$ outputs gate values $G^{single\text{-}channel}$, which is a single-channel mask that is applied to all feature channels during multiplication. The single-channel mask is similar to partial convolution, however the single-channel mask outputted by $LWGC^{sc}$ is dynamic, trainable, and can be non-binary.

Different forms of LWGC may require different numbers of parameters to be calculated. For example, the number of parameters needed for $LWGC^{ds}$ may be higher than that for $LWGC^{pw}$, which in turn is higher than that for $LWGC^{sc}$. However, all forms of LWGC have been found to require calculation of fewer parameters than conventional gated convolution. There may be trade-off between reducing the number of parameters calculated (thus improving efficiency and increasing computational speed) and a reduced quality of output. It should be understood that one skilled in the art would be able to (e.g., empirically) select a form of LWGC to use for a particular layer of a CNN. For example, in the context of the present disclosure, $LWGC^{sc}$ may be used for all convolutional layers of the coarse network 402, and $LWGC^{ds}$ or $LWGC^{pw}$ may be used for all convolutional layers of the refine network 404.

It should be noted that the usefulness and implementation of LWGC in convolutional layers are not necessarily limited to the networks 402, 404 of the inpainting generator 101 disclosed herein. The LWGC technique described above may be broadly applicable to any neural network that uses convolutional layers, and may be used to improve the performance of any neural network that uses conventional gated convolution, for example.

Reference is again made to FIG. 4. Training of the inpainting generator 101 is now discussed. The inpainting generator 101 is trained using a discriminator 418 and a loss computation operation 420.

In an embodiment of the present disclosure, training is performed by splitting the training objective into adversarial loss and reconstruction loss. The adversarial loss is based on a Wasserstein GAN (WGAN) with gradient penalty (GP). The discriminator 418 and inpainting generator 101 are alternatively trained using the following loss functions:

$$L_d = \mathbb{E}_{\tilde{x}\in\mathbb{P}_g}[D(\tilde{x})] - \mathbb{E}_{x\in\mathbb{P}_r}[D(x)] + \sigma\mathbb{E}_{\hat{x}\in\mathbb{P}_{\hat{x}}}[\|\nabla_{\hat{x}}D(\hat{x})\|_2 - 1]^2$$

$$L_{adv} = -\mathbb{E}_{\tilde{x}\in\mathbb{P}_g}[D(\tilde{x})]$$

where D(.) is the discriminator output; G(.) is the generator output; x, $\tilde{x}$ and $\hat{x}$ are real images (i.e., the original sampled images used for training data), generated images (i.e., the sampled image with inside-mask area inpainted by the inpainting generator 101), and interpolations between them, respectively; and $P_g$, $P_r$ and $P_{\tilde{x}}$ are the corresponding distributions of x, $\tilde{x}$ and $\hat{x}$ separately.

The L1 loss is calculated by the loss computation operation 420. The L1 loss (also referred to as the L1-norm loss) is a calculation of the absolute difference between the output predicted by a neural network, and the target value. The L1 loss is used during training to train the inpainting generator 101 to generate output that is consistent with the input. The computationally expensive spatially-discounted reconstruction loss is not calculated. For simplicity, a small constant weight is assigned for the reconstruction loss of all inside-mask pixels. The reconstruction loss may be thus expressed as follows:

$$L_{inside\text{-}mask} = |G(x,m) - x| \odot m$$

$$L_{outside\text{-}mask} = |G(x,m) - x| \odot (1-m)$$

$$L_{rec} = \alpha_1 L_{inside\text{-}mask} + \alpha_2 L_{outside\text{-}mask}$$

where $\alpha_1$ and $\alpha_2$ are coefficients for the inside-mask term and outside-mask term (e.g., $\alpha_1=1$, and $\alpha_2=1.2$). Both $L_{inside\text{-}mask}$ and $L_{outside\text{-}mask}$ are formulated as L1 losses. The coarse network 402 is trained using the reconstruction loss explicitly, while the refine network 404 is trained with a weighted sum of the reconstruction and GAN losses.

The coarse network 402 and refine network 404 are trained simultaneously with merged loss, denoted as $L_g$, as follows:

$$L_g = L_{rec} + \beta L_{adv}$$

where $\beta$ is the coefficient for adversarial loss (e.g., $\beta=10^{-4}$).

To diversify the inpainting masks used for training (and hence achieve a better performing trained inpainting generator 101), irregular masks may be generated during training of the inpainting generator 101. Inpainting masks may be generated using any suitable technique, such as any known technique for generating irregular holes in images. In some examples, inpainting masks may be generated using existing object shape templates. The object shape templates may be further randomly rotated, flipped, skewed, scaled, etc.

Figure 6:
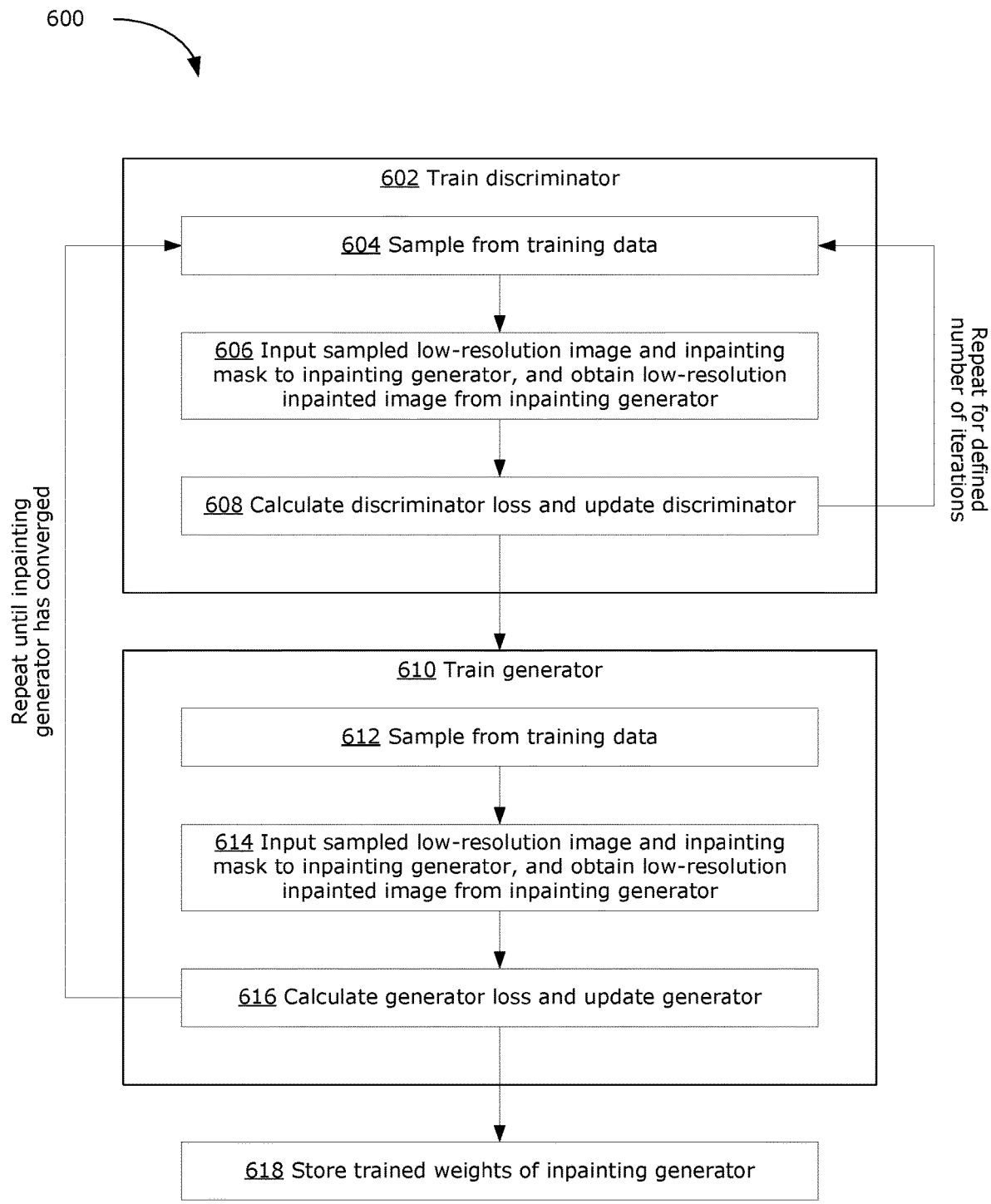
FIG. 6 is a flowchart of an example method for training an inpainting generator, in accordance with some embodiments of the present disclosure.

FIG. 6 is a flowchart illustrating an example training method 600 for training the inpainting generator 101. FIG. 7 shows pseudocode 700 of an example algorithm that may be used to implement the training method 600. The method 600 may be performed by the training device 120 shown in FIG. 1, for example. FIGS. 6 and 7 will be described together. It should be noted that the inpainting generator 101 is trained together with the discriminator 418 (according to GAN framework), however the discriminator 418 may not be used in the application stage.

The method 600 may start with an initialization step (not shown in FIG. 6), for example as shown at line 702 of the example pseudocode 700. Initialization may be performed to initialize temporary buffers, for example, which will be used to store values used in training, such as computed loss. Initialization may also be performed to initialize the weights of the discriminator 418 (denoted as D) and the inpainting generator 101 (denoted as G).

At 602, the discriminator 418 is trained for a defined number of iterations (e.g., five iterations). In this example, the discriminator 418 trained for a defined number of iterations per training iteration of the inpainting generator 101. In other examples, the discriminator 418 may be trained for only one iteration per training iteration of the inpainting generator 101. The iterations for training the discriminator 418 may be performed using a for loop, as indicated at line 706 of the pseudocode 700, for example.

Each training iteration for the discriminator 418 may be performed using steps 604-608, for example.

At 604, training data is sampled. In this case, the training data are low-resolution images (e.g., images of 512×512 pixels in size, or smaller), which may be randomly sampled from the database 130 of FIG. 1, for example. The sampled training data may also include inpainting masks to be applied to the sampled images. In other examples, inpainting masks may be randomly generated during training, as discussed above. Execution of line 708 of the pseudocode 700 results in a batch of images, denoted as x, being sampled from the training data, for batch training. At line 710 of the pseudocode 700, a set of random masks, denoted as m, is generated to be used as inpainting masks for respective images in the batch x. In this example, each inpainting mask is a binary mask, where the value "1" is used to indicate the inside-mask area, and the value "0" is used to indicate the outside-mask area.

At 606, the low-resolution image and inpainting mask are provided as input to the inpainting generator 101, and a low-resolution inpainted image is obtained as output from the inpainting generator 101. In the case where batch training is being performed, the input to the inpainting generator 101 is a batch of low-resolution images and a set of respective random inpainting masks to be applied, and the output is a set of respective low-resolution inpainted images, denoted as y (see line 712 of the pseudocode 700, for example).

At 608, the discriminator loss is calculated and used to update the weights of the discriminator 418. The discriminator loss, denoted as $L_d$, may be calculated according to the loss function described above. For example, lines 714-718 of the pseudocode 700 illustrate example instructions that are executed to obtain the set of inpainted images x̃ (which are the sampled training data images with inside-mask area inpainted using output from the inpainting generator 101) and x̂ (which is the interpolation between the original sampled training data images x and x̃), which are used to calculate the discriminator loss $L_d$. Line 720 of the pseudocode then calculates the discriminator loss $L_d$, and updates the weights of the discriminator 418 (e.g., using gradient penalty).

If the discriminator training has completed the defined number of iterations (e.g., five iterations), then the method 600 proceeds to train the inpainting generator at step 610. Otherwise, the method 600 returns to step 602 to perform another training iteration for the discriminator 418.

At step 610, the inpainting generator 101 is trained until the inpainting generator 101 converges (i.e., the weights of the inpainting generator 101 converges). Convergence may be checked for each training iteration, for example by calculating loss gradient or by calculating the weight gradient, and comparing against a defined convergence threshold. The iterations for training the inpainting generator 101 may be performed using a while loop, as indicated at line 704 of the pseudocode 700, for example.

Each training iteration for the inpainting generator 101 may be performed using steps 612-616, for example.

At 612, training data is sampled, similar to step 604. For consistency, the training data for the discriminator 418 and the training data for the inpainting generator 101 may be sampled from the same database and using the same sampling method. In this case, the training data are low-resolution images (e.g., images of 512×512 pixels in size, or smaller), which may be randomly sampled from the database 130 of FIG. 1, for example. The sampled training data may also include inpainting masks to be applied to the sampled images. In other examples, inpainting masks may be randomly generated during training, as discussed above. Execution of line 724 of the pseudocode 700 results in a batch of images, denoted as x, being sampled from the training data, for batch training. At line 726 of the pseudocode 700, a set of random masks, denoted as m, is generated to be used as inpainting masks for respective images in the batch x.

At 614, the low-resolution image and inpainting mask are provided as input to the inpainting generator 101, and a low-resolution inpainted image is obtained as output from the inpainting generator 101. In the case where batch training is being performed, the input to the inpainting generator 101 is a batch of low-resolution images and a set of respective random inpainting masks to be applied, and the output is a set of respective low-resolution inpainted images, denoted as y (see line 728 of the pseudocode 700, for example).

At 616, the generator loss is calculated and used to update the weights of the inpainting generator 101. The generator loss, denoted as $L_g$, may be calculated according to the loss functions described above. For example, line 730 of the pseudocode illustrate an example instruction that is executed to obtain the set of inpainted images k (which are the sampled training data images with inside-mask area inpainted using output from the inpainting generator 101), which is used to calculated the generator loss $L_g$ (the symbol ⊙ indicates the dot product operation). Line 732 of the pseudocode then calculates the d generator loss $L_g$, and updates the weights of the inpainting generator 101 (e.g., using gradient penalty).

If the inpainting generator 101 has sufficiently converged, then the method 600 proceeds to store the trained weights at step 618. Otherwise, the method 600 returns to step 602.

At 618, if the inpainting generator 101 has converged, the trained weights are stored, and the inpainting generator 101 is considered to be sufficiently trained for application.

The trained inpainting generator 101 may then be used by the execution device 110 of FIG. 1, as part of the inpainting subsystem 105. The inpainting subsystem 105 may use the trained inpainting generator 101 to perform inpainting of high-resolution images, as discussed above.

Figure 8:
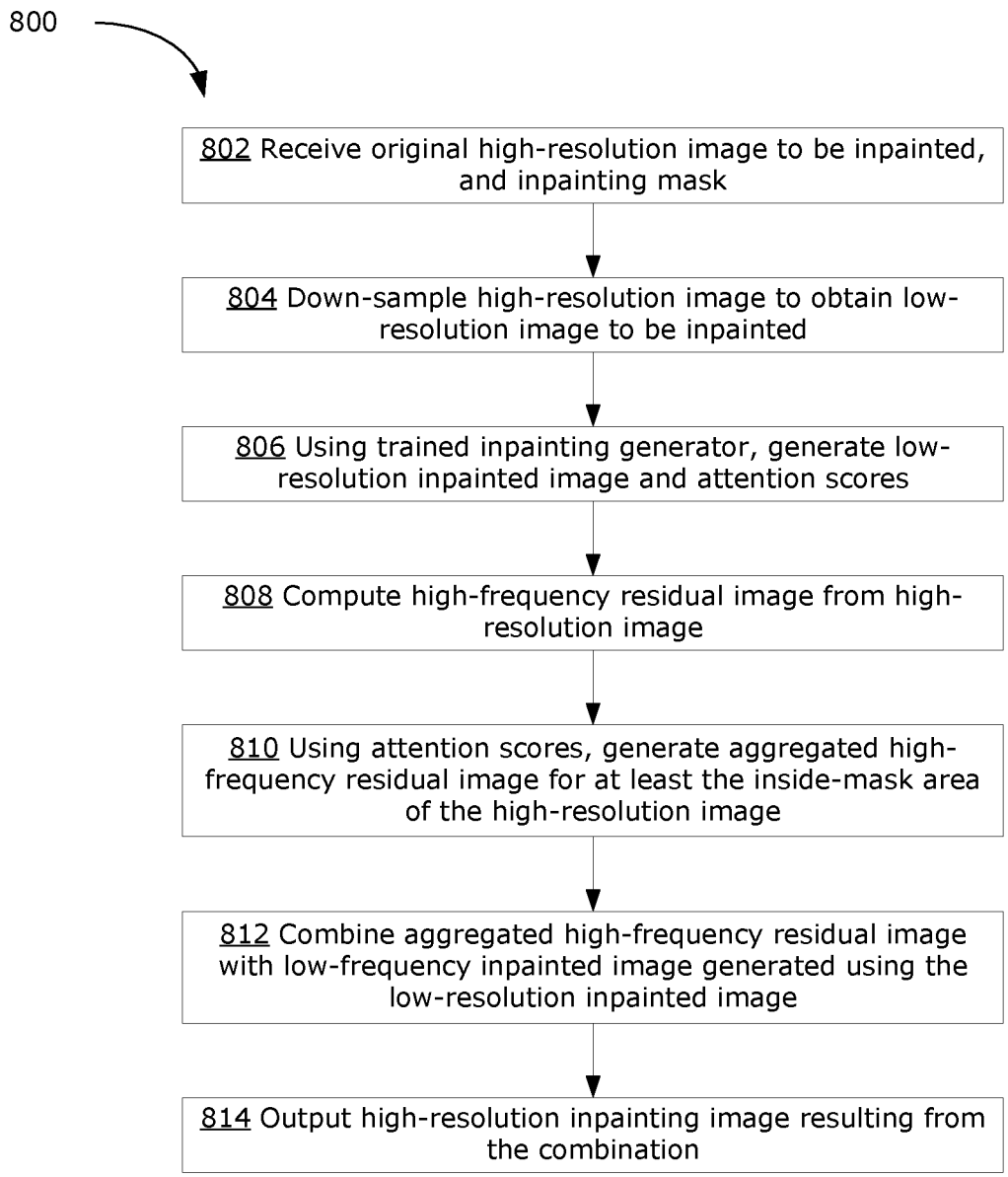
FIG. 8 is a flowchart of an example method for high-resolution image inpainting, in accordance with some embodiments of the present disclosure.

FIG. 8 is a flowchart illustrating an example method 800 for inpainting of a high-resolution image, using the trained inpainting generator 101. The method 600 may be performed by the execution device 110 shown in FIG. 1, for example.

At 802, an original high-resolution image (e.g., image of size 1024×1024 pixels, 4K resolution image, 8K resolution image, or higher) is received to be inpainted. An inpainting mask is also received. For example, the original high-resolution image may be a photograph or a set of video frames (e.g., a segment of a video) stored in the data storage 114 of the execution device 110 and selected by a user for editing. The inpainting mask may be defined by the user (e.g., by the user manually creating an inpainting mask using a user interface provided by the execution device).

At 804, the original high-resolution image is down-sampled (e.g., by the first down-sampler operation 302 of FIG. 3 or FIG. 5) to obtain a low-resolution image (e.g., image of size 512×512 pixels, or smaller) to be inpainted.

At 806, the trained inpainting generator 101 is used to generate a low-resolution inpainted image and a set of attention scores, as discussed above. Input to the trained inpainting generator 101 is the low-resolution image and the inpainting mask, and the low-resolution inpainted image outputted from the trained inpainting generator 101 is of the same pixel size and dimension as the inputted low-resolution image. The set of attention scores represent the similarity (or affinity) between all possible pairs of an outside-mask region of the low-resolution image and an inside-mask region. For example, the attention scores may be calculated by an attention computing module 414 using a highest-level feature map of a CNN in the inpainting generator 101 (see FIG. 4).

At 808, a high-frequency residual image is computed from the original high-resolution image. For example, this step may be performed by up-sampling the low-resolution image using the up-sampler operation 304, and subtracting the resulting low-frequency image from the original high-resolution image (see FIG. 3 or 5).

At 810, the attention scores from the inpainting generator 101 are used (e.g., by the first 308 attention transfer module of FIG. 3 or 5) to generate an aggregated high-frequency residual image, which contains high-frequency residual information for at least the inside-mask area of the high-resolution image. As described above, the aggregated high-frequency residual image is generated by using the attention scores as weights. Then, the high-frequency residual of each inside-mask region of the residual image is calculated as a weighted aggregation of the high-frequency residual of all outside-mask regions.

In the example embodiment of FIG. 3, the aggregated high-frequency residual image contains valid (or useful) high-frequency information only for the inside-mask area of the image. In the example embodiment of FIG. 5, the aggregated high-frequency residual image contains valid high-frequency information for both the outside-mask area and the inside-mask area.

At 812, the aggregated high-frequency residual image is combined with a low-frequency inpainted image generated from the low-resolution inpainted image generated at step 806. For example, the high-frequency residual image is combined with the low-frequency inpainted image using the addition operation 314 of FIG. 3 or 5. The low-frequency inpainted image may be generated from the low-resolution inpainted image using up-sampling by the up-sampler operation 310 of FIG. 3 or 5, for example.

The result of the combining is a high-resolution inpainted image, which is outputted at step 814. The high-resolution inpainted image may be saved to the data storage 114 of the execution device 110 of FIG. 1, and/or outputted to the user via an output device (e.g., a display) of the execution device 110, for example.

In various examples, the present disclosure has described methods and systems for inpainting of high-resolution images. In some examples, the disclosed methods and systems may be used to inpaint images as large as 8K resolution (or larger), and for inside-mask areas of significant size (e.g., up to 25% of the image, or larger). The disclosed methods and systems may enable inpainting of high-resolution images, with higher quality output compared to other existing rules-based or machine learning-based techniques.

In various evaluation tests, examples of the present disclosure have been found to perform significantly faster than some other existing machine learning-based inpainting techniques, with better or comparable output quality. Further, tests have found that examples of the present disclosure are capable of inpainting large high-resolution images (e.g., images of size 4096×4096 pixels), which is not possible using some other existing machine learning-based inpainting techniques due to limitations of memory resources in current GPUs.

Compared to some other existing machine learning-based inpainting techniques, the inpainting generator in the presently disclosed methods and systems is trained using low-resolution images, which significantly alleviates the requirements for a training dataset that includes high-resolution images (or ultra-high-resolution images). It should also be noted that, because the inpainting generator does not need to be trained using images of equal or higher resolution than the expected application input, the resolution of images to be inpainted during application of the trained inpainting generator may not be limited by the data on which the inpainting generator was trained.

In some examples, present disclosure describes a neural network model that a light-weight model, using techniques such as slim and deep layer configuration, attention score sharing, and light weight gated convolution (LWGC). It should be noted that different forms of LWGC have been described, which may be used in other neural networks. The usefulness and implementation of LWGC in convolutional layers are not necessarily limited to the inpainting generator.

The methods and systems described herein utilize attention transfer at multiple abstraction levels, which enables the filling of the inside-mask area by using weighted aggregation of features from contexts at multiple scales to improve the inpainting quality. Further, attention transfer is used for weighted aggregation of high-frequency residual information from outside-mask context to fill in high-frequency residual information for the inside-mask area.

A person of ordinary skill in the art may be aware that, in combination with the examples described in the embodiments disclosed in this disclosure, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

It should be understood that the disclosed systems and methods may be implemented in other manners. The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments. In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a universal serial bus (USB) flash drive, a removable hard disk, a read-only memory (ROM), a random access memory (RAM), a magnetic disk, or an optical disc, among others.

The foregoing descriptions are merely specific implementations of this application, but are not intended to limit the protection scope of this disclosure. Any variation or replacement readily figured out by a person skilled in the art within the technical scope disclosed in this disclosure shall fall within the protection scope of this disclosure.

The invention claimed is:

1. A method for high-resolution image inpainting, comprising:
    obtaining an original high-resolution image to be inpainted, and an inpainting mask indicating an inside-mask area to be inpainted;
    down-sampling the original high-resolution image to obtain a low-resolution image to be inpainted;
    generating, from the low-resolution image using a trained inpainting generator, a low-resolution inpainted image and a set of attention scores, the set of attention scores representing a similarity between regions of the inside-mask area and regions of an outside-mask area;
    computing, from the original high-resolution image, a high-frequency residual image;
    generating, using the set of attention scores, an aggregated high-frequency residual image including computed high-frequency residual information for at least the inside-mask area; and
    outputting, as a high-resolution inpainted image, a combination of at least the aggregated high-frequency residual image and a low-frequency inpainted image, the low-frequency inpainted image being generated from the low-resolution inpainted image.

2. The method of claim 1, wherein the inpainting generator comprises a coarse network and a refine network, the coarse network generating a coarse inpainting output from the low-resolution image, the coarse inpainting output and the low-resolution image being provided as input to the refine network to output the low-resolution inpainted image and the set of attention scores.

3. The method of claim 2, wherein the set of attention scores is computed based on a highest-level feature map of the refine network.

4. The method of claim 2, wherein the set of attention scores is used as aggregation weights to compute multiple contextualized feature maps for respective layers of the refine network.

5. The method of claim 1, wherein the inpainting generator is a trained generator network that was trained using low-resolution images as training data.

6. The method of claim 5, wherein the training data includes randomly generated inpainting masks to be applied to the low-resolution images.

7. The method of claim 1, wherein the aggregated high-frequency residual image includes high-frequency residual information computed for the inside-mask area, using weighted aggregation of high-frequency residual information from the outside-mask area, the set of attention scores being used as aggregation weights.

8. The method of claim 7, wherein generating the aggregated high-frequency residual image comprises:
    calculating, for each given region of the inside-mask area, high-frequency residual information for the given region of the inside-mask area using a weighted aggregation of high-frequency residual information from every region of the outside-mask area, the set of attention scores being used as the aggregation weights.

9. The method of claim 7, wherein the aggregated high-frequency residual image includes high-frequency residual information for only the inside-mask area, wherein the aggregated high-frequency image is combined with the low-frequency inpainted image for only the inside-mask area, and wherein the combination of the aggregated high-frequency image and the low-frequency inpainted image is further combined with the outside-mask area of the original high-resolution image, to output the high-resolution inpainted image.

10. The method of claim 7, wherein the aggregated high-frequency residual image includes high-frequency residual information for the inside-mask area, and also includes high-frequency residual information for the outside-mask area, wherein the aggregated high-frequency residual image is combined with the low-frequency inpainted image to output the high-resolution inpainted image.

11. A device for high-resolution image inpainting, comprising:
    a processor configured to execute instructions to cause the device to:
        obtain an original high-resolution image to be inpainted, and an inpainting mask indicating an inside-mask area to be inpainted;
        down-sample the original high-resolution image to obtain a low-resolution image to be inpainted;
        generate, from the low-resolution image using a trained inpainting generator, a low-resolution inpainted image and a set of attention scores, the set of attention scores representing a similarity between regions of the inside-mask area and regions of an outside-mask area;
        compute, from the original high-resolution image, a high-frequency residual image;
        generate, using the set of attention scores, an aggregated high-frequency residual image including computed high-frequency residual information for at least the inside-mask area; and output, as a high-resolution inpainted image, a combination of at least the aggregated high-frequency residual image and a low-frequency inpainted image, the low-frequency inpainted image being generated from the low-resolution inpainted image.

12. The device of claim 11, wherein the inpainting generator comprises a coarse network and a refine network, the coarse network generating a coarse inpainting output from the low-resolution image, the coarse inpainting output and the low-resolution image being provided as input to the refine network to output the low-resolution inpainted image and the set of attention scores.

13. The device of claim 12, wherein the set of attention scores is computed based on a highest-level feature map of the refine network.

14. The device of claim 12, wherein the set of attention scores is used as aggregation weights to compute multiple contextualized feature maps for respective layers of the refine network.

15. The device of claim 11, wherein the inpainting generator is a trained generator network that was trained using low-resolution images as training data, the training data also including randomly generated inpainting masks to be applied to the low-resolution images during training.

16. The device of claim 11, wherein the aggregated high-frequency residual image includes high-frequency residual information computed for the inside-mask area, using weighted aggregation of high-frequency residual information from the outside-mask area, the set of attention scores being used as aggregation weights.

17. The device of claim 16, wherein the processor is configured to execute instructions to cause the device to generate the aggregated high-frequency residual image by:
calculating, for each given region of the inside-mask area, high-frequency residual information for the given region of the inside-mask area using a weighted aggregation of high-frequency residual information from every region of the outside-mask area, the set of attention scores being used as the aggregation weights.

18. The device of claim 16, wherein the aggregated high-frequency residual image includes high-frequency residual information for only the inside-mask area, wherein the aggregated high-frequency image is combined with the low-frequency inpainted image for only the inside-mask area, and wherein the combination of the aggregated high-frequency image and the low-frequency inpainted image is further combined with the outside-mask area of the original high-resolution image, to output the high-resolution inpainted image.

19. The device of claim 16, wherein the aggregated high-frequency residual image includes high-frequency residual information for the inside-mask area, and also includes high-frequency residual information for the outside-mask area, wherein the aggregated high-frequency residual image is combined with the low-frequency inpainted image to output the high-resolution inpainted image.

20. A non-transitory computer-readable medium having instructions encoded thereon, wherein the instructions, when executed by a processor of a device, cause the device to:
obtain an original high-resolution image to be inpainted, and an inpainting mask indicating an inside-mask area to be inpainted;
down-sample the original high-resolution image to obtain a low-resolution image to be inpainted;
generate, from the low-resolution image using a trained inpainting generator, a low-resolution inpainted image and a set of attention scores, the set of attention scores representing a similarity between regions of the inside-mask area and regions of an outside-mask area;
compute, from the original high-resolution image, a high-frequency residual image;
generate, using the set of attention scores, an aggregated high-frequency residual image including computed high-frequency residual information for at least the inside-mask area; and
output, as a high-resolution inpainted image, a combination of at least the aggregated high-frequency residual image and a low-frequency inpainted image, the low-frequency inpainted image being generated from the low-resolution inpainted image.

* * * * *